United States Patent
Lopez Medrano

(10) Patent No.: US 7,200,123 B2
(45) Date of Patent: Apr. 3, 2007

(54) METHOD AND APPARATUS FOR THE POWER CONTROL SYSTEM OUTER LOOP OF A MOBILE COMMUNICATIONS SYSTEM

(75) Inventor: Alvaro Lopez Medrano, Madrid (ES)

(73) Assignee: T.O.P. Optimized Technologies, S.L., Madrid (ES)

(*) Notice: Subject to any disclaimer, the term of this patent is extended or adjusted under 35 U.S.C. 154(b) by 170 days.

(21) Appl. No.: 10/538,159

(22) PCT Filed: Dec. 12, 2003

(86) PCT No.: PCT/ES03/00630

§ 371 (c)(1),
(2), (4) Date: Jun. 8, 2005

(87) PCT Pub. No.: WO2004/057773

PCT Pub. Date: Jul. 8, 2004

(65) Prior Publication Data

US 2006/0166691 A1    Jul. 27, 2006

(30) Foreign Application Priority Data

Dec. 20, 2002   (ES) ............................. 200202947

(51) Int. Cl.
G08C 17/00   (2006.01)
H04B 7/00    (2006.01)

(52) U.S. Cl. .................. 370/311; 370/333; 455/522

(58) Field of Classification Search .............. 370/311, 370/331, 332, 335, 342, 328–329, 333; 455/522, 455/127.5, 63.1, 67.11, 114.2, 135
See application file for complete search history.

(56) References Cited

U.S. PATENT DOCUMENTS 6,219,342 B1    4/2001 Rege
6,434,124 B1 *  8/2002 Rege ........................ 370/311

(Continued)

OTHER PUBLICATIONS

Chang, et al., Novel power control scheme for multimedia CDMA transmission, Enabling Technologies for 3G and Beyond, vol. 4529, Nov. 2001, pp. 57-68.

(Continued)

*Primary Examiner*—Sonny Trinh
(74) *Attorney, Agent, or Firm*—Knobbe Martens Olson & Bear LLP

(57) ABSTRACT

Method and apparatus for the power control system outer loop of a mobile communications systems in a cellular infrastructure that allows fulfilling a given Quality of Service (QoS) with the minimum power level necessary. This outer loop is in charge of setting the desired signal to interference target ratio $SIR_{tgt}$ that fulfils the required quality of service in a radioelectric environment characterised by stochastic models. The proposed method is based on the application of the Newton-Raphson iteration method on numerical approximations of the various outage probability (QoS) probability density functions in various propagation environments, so that having established this probability and dynamically estimated the second order moments characteristic of each statistic considered, the margin over the SIR median is obtained and thereby the $SIR_{tgt}$ corresponding to the aforementioned outage probability.

9 Claims, 4 Drawing Sheets

U.S. PATENT DOCUMENTS

| | | | |
|---|---|---|---|
| 6,449,462 B1* | 9/2002 | Gunnarsson et al. | 455/67.13 |
| 6,615,044 B2* | 9/2003 | Tigerstedt et al. | 455/437 |
| 6,647,273 B2* | 11/2003 | Parssinen et al. | 455/522 |
| 2005/0085255 A1* | 4/2005 | Andersson et al. | 455/522 |
| 2006/0014487 A1* | 1/2006 | Jonsson | 455/1 |
| 2006/0099913 A1* | 5/2006 | Nilsson et al. | 455/69 |

OTHER PUBLICATIONS

Kandukuri, et al., Optimal power-control in interference-limited fading wireless channels with outage-probability specification, IEEE Transactions on Wireless Communications, vol. 1, No. 1, Jan. 2002, pp. 46-55.

Zorzi, M., Power control and diversity in mobile radio cellular systems in the presence of ricean fading and log-normal shadowing, IEEE Transactions on Vehicular Technology, vol. 45, No. 2, May 1996, pp. 373-382.

Zhang, Q. T., Outage probability of cellular mobile radio in the presence of multiple nakagami interferers with arbitrary fading parameters, IEEE Transactions on Vehicular Technology, vol. 44, No. 3, Aug. 1995, pp. 661-667.

International Preliminary Examination Report for International Application No. PCT/ES03/00630 dated Jan. 5, 2005.

* cited by examiner

300

400

METHOD AND APPARATUS FOR THE POWER CONTROL SYSTEM OUTER LOOP OF A MOBILE COMMUNICATIONS SYSTEM

TECHNICAL FIELD OF THE INVENTION

This invention relates to the field of wireless communications and, more specifically, to the outer loop of the power control system of a cellular telephony network.

STATE OF THE ART

In January 1998, the European Telecommunications Standards Institute (ETSI) selected the base technology for the Universal Mobile Telecommunications System (UMTS) (see ETSI, "The ETSI UMTS Terrestrial Radio Access (UTRA) ITU-R RTT Candidate Submission", June 1998). The main radio interface proposed was the WCDMA (Wideband Code Division Multiple Access), whose characteristics allow a full compliance with third-generation (3G) mobile telephony requirements. Due to the high data transmission rate and the more demanding Quality of Service (QoS) requirements in 3G, it became necessary to develop new planning strategies. The most studied one among these is probably the power control system, specifically the method used to implement the outer loop of this system.

Such a power control system is described below in a general manner, as the functionality of the outer loop, for which a method is proposed in this invention, results from other system components. A power control system is needed in WCDMA-based cellular networks because this technology is limited by interference, as all users share the same frequency spectrum and their codes are not fully orthogonal (see Holma & Toskala: "WCDMA by UMTS, Radio Access for Third Generation Mobile Communications", John Wiley & Sons.). The ultimate goal of the power control system in WCDMA systems is to attain the quality of service required in a specific link (uplink or downlink) with a minimum transmit power level. This invention is specifically centred on this aspect.

Cancellation of the near-far effect: if all mobile stations transmitted the same power regardless of their distance or fading to the base station, cell phones nearer this station would represent a significant interference for more distant ones.

Protection against deep fading.

Minimisation of the network interference with the resulting improved capacity.

Longer duration of mobile station batteries.

A WCDMA power control system is implemented by three differentiated loops:

Open loop: during the random access process at the start of a connection, the base/mobile station estimates the power loss in the uplink/downlink and adjusts its transmit power accordingly.

Closed or inner loop: Also known as the fast power control (1500 Hz), comprised of the following three stages:

The corresponding reception terminal (the base station or the mobile unit) compares the desired signal to interference received ratio ($SIR_{rec}$) and the desired signal to interference target ratio $SIR_{tgt}$, which depends on the quality of service required for this specific link that is determined by the outer loop as described further below.

The same reception terminal sends power control bits indicating whether the transmit power must be increased (if $SIR_{rec} < SIR_{tgt}$) or reduced (if $SIR_{rec} > SIR_{tgt}$) by a certain amount (normally 1 dB).

The transmission unit increases or reduces its power by the previously determined amount.

Outer loop: it is much slower than the closed loop (10–100 Hz), establishing the desired signal to interference target ratio $SIR_{tgt}$ that allows maintaining a predetermined quality goal. One measure of the link quality is the Frame Error Rate (FER), which depends on the desired signal to interference ratio SIR. As the inner loop helps to maintain the SIR near the $SIR_{tgt}$, the FER is ultimately determined by this target value. Thus, to attain a quality of service in a specific fade environment the $SIR_{tgt}$ value must be adjusted to a suitable value for this environment.

Unfortunately, no $SIR_{tgt}$ exists that can attain the required FER for all fading environments. For this reason, adjusting this target ratio is a current object of study and mechanisms for adjusting the $SIR_{tgt}$ correspondingly have been described. These designs measure the FER and change the $SIR_{tgt}$ according to whether it is above or under the desired threshold. In any case, as the FER measuring method is quite slow (around 2 seconds), the performance of these systems is greatly deteriorated in dynamic environments with fading characteristics that change over very short time periods.

Thus, in order to increase the speed of the outer loop, the patent application titled "Symbol Error Based Power Control For Mobile Telecommunications System" (Carl Weaver, Wei Peng), Ser. No. 08/346800, of 30 Nov. 1994, describes a method based on the Symbol Error (SE) that improves the loop performance in dynamic fading environments. This procedure is based on the premise that the Symbol Error Rate (SER) and the FER are highly correlated, and thus attempts to maintain the SER close to a predetermined target SER value. As before, this is achieved by increasing or decreasing the $SIR_{tgt}$.

Kirian M. Rege, in U.S. Pat. No. 6,434,124 B1, of 13 Aug. 2002, explains that the aforementioned correlation between the SER and the FER varies in different radioelectric environments, and that therefore the previously described method based on a fixed target SER cannot maintain the FER near the target in these different environments. Therefore, he concludes that to attain the desired FER under different radioelectric conditions several target SER's are required, and proposes a technique based on the Symbol Error Count that ensures the desired FER under different fading conditions.

In addition, Jonas Blom, Fredrik Gunnarson and Fedrik Gustafsson in their U.S. Pat. No. 6,449,462, of 10 Sep. 2002, establish a method for controlling the $SIR_{tgt}$ also based on measuring the FER and estimating certain parameters representative of the different radioelectric channel conditions and the statistical distribution of the interfering signals. This method is based on determining a quality function defined as the frame error likelihood that depends on the aforementioned parameters. Although this strategy implies capacity gains on the order of 30%, the process for obtaining the said quality function introduces a delay that, as previously mentioned, delays the performance of this type of models. In addition, the paper by the same authors which describes the invention in greater technical detail: "Estimation and Outer Loop Power Control in Cellular Radio Systems" submitted to ACM Wireless Networks, states that the system may be degraded due to fading in the radioelectric channel.

SUMMARY OF CERTAIN INVENTIVE EMBODIMENTS

The method and apparatus disclosed for the power control system outer loop of a mobile communications system allow determining the fading margin for the desired signal to interference ratio ($M_{(SIR)}$ (dB)), and thus the $SIR_{tgt}$ for a quality of service criterion given by the outage probability ($P_{outage}$) and statistical moments characteristic of the radioelectric channel being considered. This allows complying with the aforementioned QoS with the minimum power level needed which, as this technology is limited by interference, also allows the optimization of the system capacity. As mentioned before, the quality criteria on which this invention is based on, instead of the FER as in the previous cases, is the outage probability parameter, which is another quality parameter often used in cellular infrastructures. The $P_{outage}$ value is often determined in the cellular network planning stage, and among other parameters depends on:

the characteristics of the corresponding cell, on the area within it and the type of service covered by the link.

The theoretical grounds on which the present invention is based are described below: Radio waves propagate in a medium that suffers random variations in its physical properties, which affect the signal field intensity, so that the field values show variations along points equidistant from the transmitter (variations with location) and in time (time variations). Field variations are described by different statistical distributions, depending on the link characteristics.

Thus, it is possible to obtain the outage probability ($P_{outage}$) of a communication for a given margin on the $SIR_{rec}$ median and for given statistical moments by integrating the probability density function (pdf) obtained by combining the respective pdf's of the desired and interference signals. The most common case is that the aforementioned integral cannot be expressed by elementary functions, so that numerical methods are required.

This invention solves the process inverse of that described in the previous paragraph, to apply it for obtaining the desired signal to interference target ratio $SIR_{tgt}$ of the outer loop in a WCDMA power control system. Thus, using numerical approximations to the statistics that describe the variation of the SIR in a given environment, an iterative method is applied that allows obtaining the margin above the SIR median required to comply with the outage probability specification (QoS) for this specific link, as well as for second-order statistical moment values (such as the typical deviation) which are dynamically estimated and thus are compatible with the various fading conditions that characterise an environment at a given time. Note that the method described is based on a stochastic propagation method and therefore does not intend to estimate the value of the desired signal to interference ratio (SIR) required to comply with the Quality of Service (QoS), but instead intends to provide the value of the required margin ($M_{(SIR)}$ (dB)) above the median of its probability density function.

As a result, this invention provides a mathematically rigorous method for maintaining the quality of service (QoS) of a specific link that can also respond to constant statistical variations of the radioelectric channel, unlike the previously cited methods based on FER measurements.

DETAILED DESCRIPTION

Figure 1:
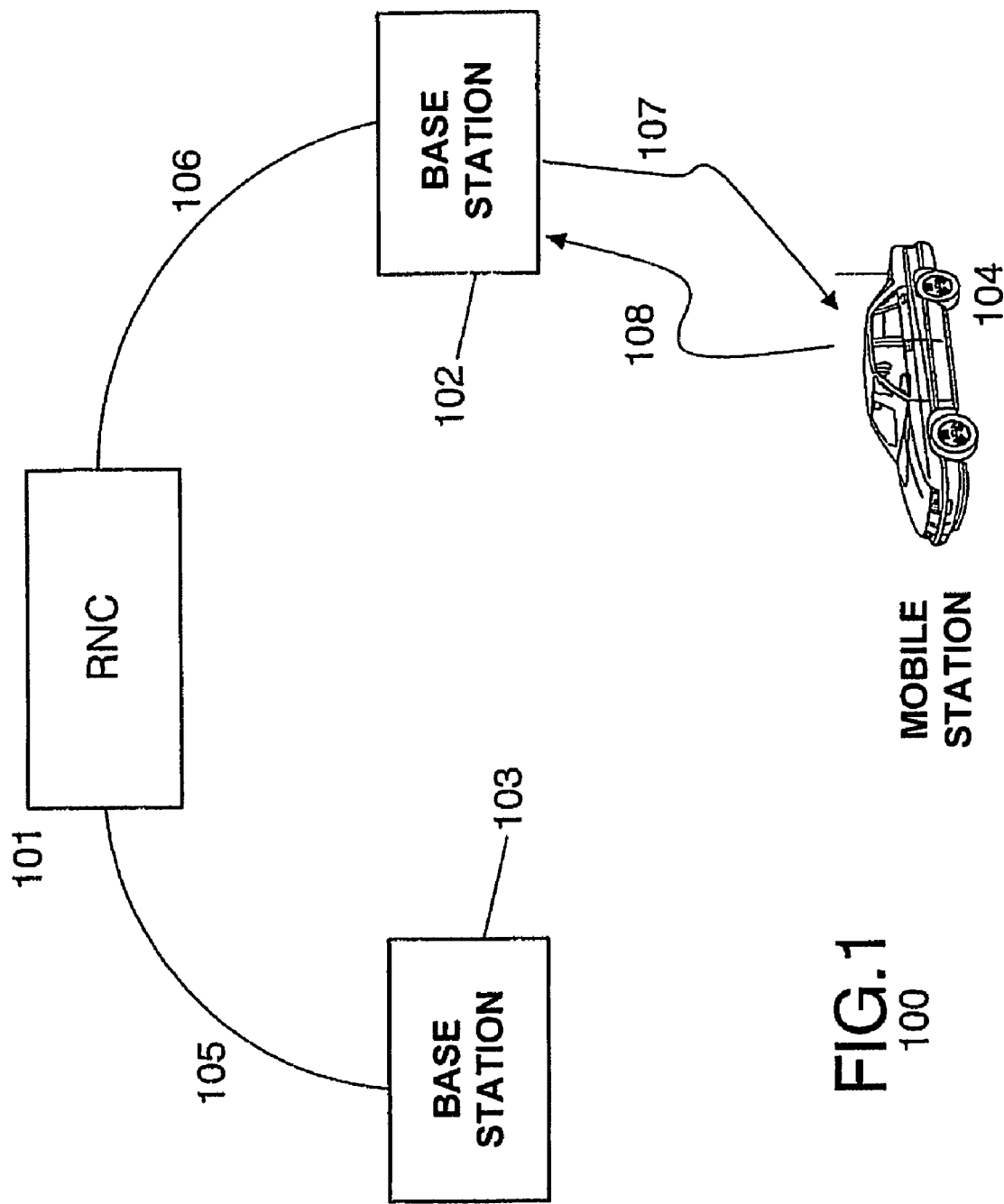
FIG. 1 is a block diagram of a portion of a mobile communications system related to the principles on which embodiments of the invention are based.

As this invention is based on stochastic methods that attempt to describe the variation of the radioelectric signal in certain environments and is intended for application to real systems, these models must be as accurate as possible even if this requires a greater mathematical complexity.

The statistics considered for the desired signal and interfering signals under several radioelectric environments are given below in a reasoned manner.

Desired Signal Statistics:

The present invention is applicable to macro or microcellular channels in rural, suburban and urban environments.

In an urban microcells environment the statistical variation of the desired signal intensity is described in a different manner depending on whether a direct beam exists between the emitter and the receiver. Thus, in the first case there are LOS (Line of Sight) communications and in the second there are NLOS (Non Line Of Sight) communications. The statistical distributions modelling these situations are described below:

NLOS (Non Line of Sight)

Following the model by Suzuki (see F.Hansen, F. L. Meno, "Mobile Fading-Rayleigh and Lognormal Superimposed", IEEE Trans. On Vehicular Tech., vol. 26, no. 4, p. 332–335, November 1977) the signal envelope is described with a Rayleigh-Lognormal distribution.

In this case the fluctuations of the field values are considered along points equidistant from the transmitter (variations with locations) which follow a lognormal law and time variations in the same point, resulting from multipath propagation, described by a Rayleigh distribution. Depending on the resulting type of signal fading, variation with locations is referred to as slow fading or shadowing and multipath propagation variation is referred to as fast or Rayleigh fading.

The power control imperfections cause a modulation of the desired signal that can also be described by a Lognormal distribution (see Wai-Man Tam, Francis C. M. Lau "Analysis of Power Control and its Imperfections in CDMA Cellular Systems", IEEE Trans. On Vehicular Tech., vol. 48, no. 5, p. 1706–1717, September 1999)

LOS (Line of Sight)

Here the model follows a Nakagami-Rice-Lognormal distribution (see G. E. Corazza, F. Vatalaro, "A Rice-Lognormal Terrestrial and Satellite Channel Model", IEEE Trans. Veh. Technol., vol. 43, no. 3, p. 738–742, 1994). This distribution can be justified as follows: the statistical description of the variations of a signal comprising a deterministic component (direct beam) and several random components results in a Nakagami-Rice distribution. The lognormal component appears as the representation of the slow fading or shadowing effects, which can take place in the communication, as well as the aforementioned effect of the power control imperfections.

It must be remarked that a random variable measured in watts W that follows a lognormal distribution, when expressed in dBW applying the 10 log(x) function, will follow a Gaussian distribution. This property is stated here as it is applied often in the following expressions.

Interference Signal Statistics:

In WCDMA, a number of interfering users transmit simultaneously in the same cell (intracellular) or in adjacent cells (intercellular). Applying the Central Limit Theorem, the random variable resulting from the sum of these components is Gaussian (see A. M. Viterbi, A. J. Viterbi, E. Zehavi, "Other-cell interference in Cellular Power-Controlled CDMA", IEEE Trans. On Communications, Vol. 42, no. 2/3/4, p. 1501–1504, February/March/April 1994). The thermal noise and that of human origin are normally negligible compared to that produced by the aforementioned interfering signals.

SIR Probability Density Function:

The SIR is given by the following expression:

$$S/I(dB) = S(dBm) - I(dBm)$$

Note: the measurement in dBm is obtained by applying the 10 log(x) function to a measurement in mW.

Where S and I are respectively the power values of the desired and interfering signals. The margin with respect to the distribution median, as a function of which the outage probability is calculated, will be given by:

$$M_{(S/I)}(dB) = -S/I(dB)$$

In view of the above, the probability density function (pdf) of the SIR will be given by the convolution of the pdf's of the desired and interfering signals, providing the following expression as a function of the margin:

$$f_{S/I}(M_{(S/I)}) = \int_{-\infty}^{\infty} f_S(M_{S/I} - u) f_I(u) du$$

and for the distribution function, which provides the outage probability for a given margin $M_{(S/I)0}$, we have:

$$F_{S/I}(M_{(S/I)_0}) = \int_{-\infty}^{M_{(S/I)_0}} \int_{-\infty}^{\infty} f_S(M_{(S/I)} - u) f_I du\, dM_{(S/I)}$$

If the order of integration is changed in the above expression, it can be seen that the distribution function of the desired signal is obtained, as its probability density function is integrated:

$$F_S(S_0) = \int_{-\infty}^{S_0} f_S(S_0) dS \quad (1)$$

where $F_S$ is the aforementioned distribution function for the random variable S, which corresponds to the desired signal. As mentioned above, this will be a Nakagami-Rice-Lognormal or Rayleigh-Lognormal distribution, depending on whether or not there is a direct beam between the emitter and the receiver. The integral of equation (1) cannot be expressed as elementary functions in either case, and must be calculated by numerical methods.

Finally, we have the following expression for the outage probability for a given margin of the desired signal to interference ratio SIR:

$$F_{\frac{S}{I}}(M_{(S/I)_0}) = \int_{-\infty}^{\infty} F_S(M_{(S/I)_0} - u) f_I(u) du \quad (2)$$

Thus, the objective is to evaluate the expression of equation (2) for the NLOS and LOS cases. To do so, the aforementioned numerical expressions for $F_S$ will be substituted, where $f_I$ is the probability density function of the interfering signals, which as previously stated is a Gaussian distribution given by:

$$f_I(I) = \frac{1}{\sqrt{2\pi}\, \sigma_I} \exp\left[-\frac{I^2}{2\sigma_I^2}\right]$$

where $\sigma_I$ is the typical deviation of the normal distribution in dB, which as will be seen further below is one of the dynamically estimated parameters used to evaluate the statistical variations of the channel.

Numerical Approximations for the Desired Signal Distributions:

Rayleigh-Lognormal (Suzuki Model)

This probability distribution function is given by the following expression:

$$F_{R-LN}(p) = \frac{10}{\ln(10)\sqrt{2\pi}\,\sigma_N} \int_0^\infty \frac{1}{\bar{p}} \exp\left(-\frac{p}{\bar{p}}\right) \exp\left\{-\frac{\left(\frac{\bar{p}}{\bar{\bar{p}}}\right)^2}{0.02(\ln^2 10)\sigma_N^2}\right\} d\bar{p}$$

where $\bar{p}$ is the local average corresponding to Rayleigh time variations and $\bar{\bar{p}}$ is the sectorial average corresponding to lognormal location variations. The typical deviation of this component is $\sigma_N$(dB), which is another parameter estimated to deal with the changing fading conditions of the radio-electric channel. As expected, $\sigma_N$ is zero, as the distribution degenerates into a Rayleigh distribution.

In this case the margin in dB is defined by the following expression:

$$M_0(dB) = 10\log\frac{\bar{\bar{p}}}{p}$$

In natural units this margin is:

$$m_0 = 10^{\frac{M_0}{10}}$$

To express the above integral as a function of the margin, the following change of variables is made:

$$x = \frac{\bar{p}}{\bar{\bar{p}}}$$

To thereby obtain:

$$F_{R-LN}(m_0) = \frac{10}{\ln(10)\sqrt{2\pi}\,\sigma_N} \int_0^\infty \frac{1}{x}\left[1 - \exp\left(-\frac{1/m_0}{x}\right)\right] \exp\left\{-\frac{(\ln x)^2}{0.02(\ln^2 10)\sigma_N^2}\right\} dx$$

As anticipated, the integral appearing in the above expression must be solved by numerical methods. In this case there is an indetermination at x=0, so that an open integration formula is used to avoid considering this point.

In any case, with the change of variable:

$$Y = \ln(x)$$

this indetermination is avoided and the following is obtained:

$$F_{R-LN}(m_0) = \frac{10}{\ln(10)\sqrt{2\pi}\,\sigma_N}$$

$$\int_{-\infty}^{\infty} \left\{1 - \exp\left[-10^{-\frac{M_\infty}{10}}\exp(-Y)\right]\right\} \exp\left\{-\frac{Y^2}{0.02(\ln^2 10)\sigma_N^2}\right\} dY$$

Thus, an integral with a Gauss-Hermite weight function ($e^{-x^2}$) and integration interval ($-\infty,\infty$) is left, so that a formula of this type is applied to obtain the desired result.

An analysis of the error made when comparing to existent charts (see Hernando Rábanos José María, "Transmisión por radio", Centro de Estudios Ramón Areces, S. A. 1993) shows that this error is under $10^{-4}$ for all outage probability values, for the typical deviation of the lognormal component equal or under 12 dB, and for margins under 35 dB; this is, values that include the most extreme conditions.

Nakagami-Rice-Lognormal.

In this case, the desired signal comprises one deterministic component and several random components. The resulting probability density function is the Nakagami-Rice function:

$$p(r) = \frac{r}{b} \exp\left(-\frac{r^2 + c^2}{2b}\right) I_0\left(\frac{c \cdot r}{b}\right) \quad (3)$$

where:
2b: the mean quadratic value of the random component.
C: the effective value of the deterministic component
$I_o$: Modified Bessel function of the first kind, zero order.

The effective value of the signal total average power is given by $2b+c^2$ which without loss of generality can be assumed to be normalised to 1, i.e.:

$$2b + c^2 = 1$$

so that when one of the two parameters is specified the other one will be univocally determined.

It is also common to express this distribution as a function of the Rice factor K, expressed in dB and given by the quotient of the deterministic and random components, so that:

$$K(\text{dB}) = 10 \log k = 10 \log\left(\frac{c^2}{2b}\right)$$

The Rice factor is the parameter estimated for a dynamic characterisation of the channel, as will be seen later. The mean quadratic value of the random component can be expressed as a function of the Rice factor as follows:

$$2b = \frac{1}{1 + 10^{\frac{K(\text{dB})}{10}}}$$

To consider slow fading (shadowing) effects, the random variable describing the previous situation (Nakagami-Rice) is multiplied by a random variable that follows a Lognormal distribution. When working in dB, the above is equivalent to adding a random component following a Gaussian or Normal distribution characterised by a typical deviation $\sigma_N$, so that the resulting probability density function will be the convolution of the previous Nakagami-Rice function with this Gaussian function. This is, applying the same principles used to obtain equation (2) we obtain the same expression, where the random variable S is now of the Nakagami-Rice type and the random variable I which there represented the contribution of the interfering signals is now called N, as it represents the slow fading effect modelled as a normal distribution, always corresponding to the desired signal. Thus, for a given margin $m_0$:

$$F_{NR-LN}(m_0) = \int_{-\infty}^{\infty} F_{NR}(m_0 - u) f_N(u) du \quad (4)$$

$F_{NR}$ according to equation (3) will be given by:

$$F_{NR}(r_0) = \int_0^{r_0} \frac{r}{b} \exp\left(-\frac{r^2 + c^2}{2b}\right) I_0\left(\frac{c \cdot r}{b}\right) dr \quad (5)$$

The object is to obtain an expression using numerical integration methods to then introduce it in the previous expression. Thus, we first approximate the Bessel function with the following form:

$$I_0(\beta) = \frac{1}{2\pi} \int_0^{2\pi} e^{\beta \cos\theta} d\theta$$

After making a suitable change of variable to obtain integration limits of 1 and −1 we can apply a Gauss-Legendre formula to numerically solve the previous integral.

After the above approximation is made in equation (5) another change of variable is made to again obtain integration limits of 1 and −1 to apply once more the Gauss-Legendre formula.

Finally, the expression required for the distribution function $F_{NR-LN}$ is obtained by introducing in equation (4) the approximation obtained for $F_{NR}$ and replacing $f_N(u)$ with the expression corresponding to a Gaussian distributio $$f_N(u) = \frac{1}{\sqrt{2\pi}\,\sigma_N} \exp\left[-\frac{u^2}{2\sigma_N^2}\right]$$

A suitable change of variable gives an integral with the Gauss-Hermite weight function ($e^{-x^2}$) and integration interval ($-\infty,\infty$) is left, so that a formula of this type is applied to obtain the desired result.

As in the previous case for the Suzuki model, the error made has been analysed by comparing to existing charts (see Hernando Rébanos José María, "Transmisión por radio", Centro de Estudios Ramón Areces, S. A., 1993), establishing that the error made is on the order of $10^{-4}$ for all values of the 2b parameter or equivalent of the Rice Factor K, margin $M_0$ (dB) and outage probabilities in the interval of interest, this is, under or equal to 1%.

Numerical Approximations of the SIR Probability Distribution Functions:

The objective is to solve the integral of equation (2) for the two distribution functions of the desired signal: Rayleigh-Lognormal ($F_{R-LN}$) and Nakagami-Rice-LogNormal ($F_{NR-LN}$).

In the first case we have:

$$F_{\underline{R-LN}_T}(M_{(S/I)_0}) = \int_{-\infty}^{\infty} F_{R-LN}(M_{(S/I)_0}) f_I(u) du$$

Which turns out from the point of view of numerical integration to be the same type of problem as that of equation (4), so that a Gauss-Hermite formula is applied after a suitable change of variable.

This leaves the following expression:

$$F_{\underline{R-LN}_T}[M_{(S/I)_0}(dB), \sigma_N(dB), \sigma_I(dB)] \quad (6)$$

Which provides the outage probability of an NLOS communication for a given margin $M_{(S/I)0}$ of the desired signal to interference ratio and values of the typical deviations $\bullet_N$ (corresponding to slow or lognormal fading of the desired signal) and $\sigma_I$ (that statistically describes the joint contribution of all intra and intercellular interfering signals).

For the Nakagami-Rice-Lognormal (LOS) case, the following observation can be made: the random variable modelling the lognormal component of the desired signal is transformed into a Gaussian distribution (with typical deviation $\bullet_N$) and that describing the statistical distribution of the interfering signals is also a Gaussian distribution with typical deviation $\sigma_I$.

The desired and interfering signals expressed in dB are linearly related in the SIR calculation (subtracted) and the random variable resulting from a linear combination of two statistically independent Gaussian distributions (as is the case here) is also Gaussian, with a variance that is the sum of the individual variances according to the convolution theorem (see Peyton Z. Peebles, JR.: "Probability, Random Variables, and Random signal principles", McGRAW-HILL INTERNATIONAL EDITIONS Electrical Engineering Series, 1987). Thus, we have a normal probability density function which we shall call fN–I characterised by a typical deviation given by the following expression:

$$\sigma_{N-I}(dB) = \sqrt{\sigma_N^2 + \sigma_I^2}$$

So that finally, the outage probability for a LOS case is $$F_{\underline{NR-LN}_T}(M_{(S/I)_0}) = \int_{-\infty}^{\infty} F_{NR}(M_{(S/I)_0} - u) f_{N-I}(u) du$$

calculated as:

Which is again solved numerically with a Gauss-Hermite quadrature formula.

Finally, an expression is left that provides the outage probability of a LOS communication for a given margin $M_{(S/I)0}$ of the desired signal to interference ratio and values of the typical deviations $\bullet_N$ (corresponding to slow or log-normal fading of the desired signal) and $\sigma_I$ (that statistically describes the joint contribution of all intra and intercellular interfering signals):

$$F_{\underline{NR-LN}_T}[M_{(S/I)_0}(dB), K(dB), \sigma_N(dB), \sigma_I(dB)] \quad (7)$$

The way of checking the reliability of the outage probabilities obtained by (6) and (7) was to impose the condition that the interfering signal typical deviation $\sigma_I$ is zero, so that the problem is reduced to the case with interference for which graphs exist in the literature.

Solution of the Inverse Problem:

The object is to obtain the $M_{(S/I)}$ (dB) margin, which for certain statistical conditions will fulfil a given outage probability specification $P_{Outage}$ (QoS). To do so, we use equations (6) y (7) to obtain the outage probability for the LOS and NLOS cases, obtaining the following two probabilities:

$$P_{Outage} = F_{SIR}|_{NLOS}[M_{SIR_0}(dB), \sigma_N(dB), \sigma_I(dB)]$$

$$P_{Outage} = F_{SIR}|_{LOS}[M_{SIR_0}(dB), \sigma_N(dB), K(dB), \sigma_I(dB)]$$

To unify criteria, the above expressions are generalised as follows:

$$F[M_{SIR}(dB), \overline{m}_j(dB)] = P_{Outage} \quad (8)$$

where $m_j$ represents the second order statistical moments corresponding to each case. As the values of these statistical moments are constant during the iteration on which the method is based, from now on the margin $M_{(S/I)}$ shall be considered to be the only variable of F.

The Newton-Raphson method (see H. R. Schwarz, J. Waldvogel: "Numerical Analysis", John Wiley & Sons) has been chosen to solve the problem presented in equation (8):

We define a function g whose variable is the margin, as follows:

$$g[M_{SIR}(dB), \overline{m}_j(dB)] = F[M_{SIR}(dB), \overline{m}_j(dB)] - P_{Outage} \quad (9)$$

As may be inferred from (8) and (9), the object is to obtain the zeroes of the function g. To do so, from an initial value for the margin $M_{(S/I)0}|_0$ we will apply the expression:

$$M_{(S/I)}|_1 = M_{(S/I)}|_0 - \frac{g[M_{(S/I)}|_0]}{g'[M_{(S/I)}|_0]} \quad (10)$$

Similarly, $M_{(S/I)}|_{i+1}$ is calculated as a function of $M_{(S/I)}|_i$. The process is ended when the difference between the two last values found for the margin differ by less than a given value, which in this case is set at $10^{-4}$.

The expression (10) implies calculation of the derivative with respect to the margin of expressions (6) and (7) as in fact, considering (9), it is obvious that:

$$g'[M_{(S/I)}(dB)_i] = F'[M_{(S/I)}(dB)]$$

The margin values determined by the above method must be corrected by the corresponding factor if diversity techniques or RAKE receptors are used (see Don Torrieri: "Instantaneous and Local-Mean Power Control for Direct-Sequence CDMA Cellular Networks", U.S. Army Research Laboratory).

Now considering FIG. 1, represented in it is part of a WCDMA mobile communications system (100). Aside from the invention, the elements shown in the figure are well known and will not be described in detail. Thus, the base station 102 includes processors, memories, interface cards and embedded software programs. The figure contains an RNC (Remote Network Controller) 101 which among other functions processes calls; two base stations: 102, 103; and one mobile station 104 represented by the vehicle icon. The two base stations and the mobile station are representative of end points of the wireless interface. Each base station shall be associated to one RNC 101 through the land lines 105 and 108. Hereinafter, it is assumed that the mobile station 104 communicates with the base station 102 through the downlink signal 107 and the uplink signal 108.

Figure 2:
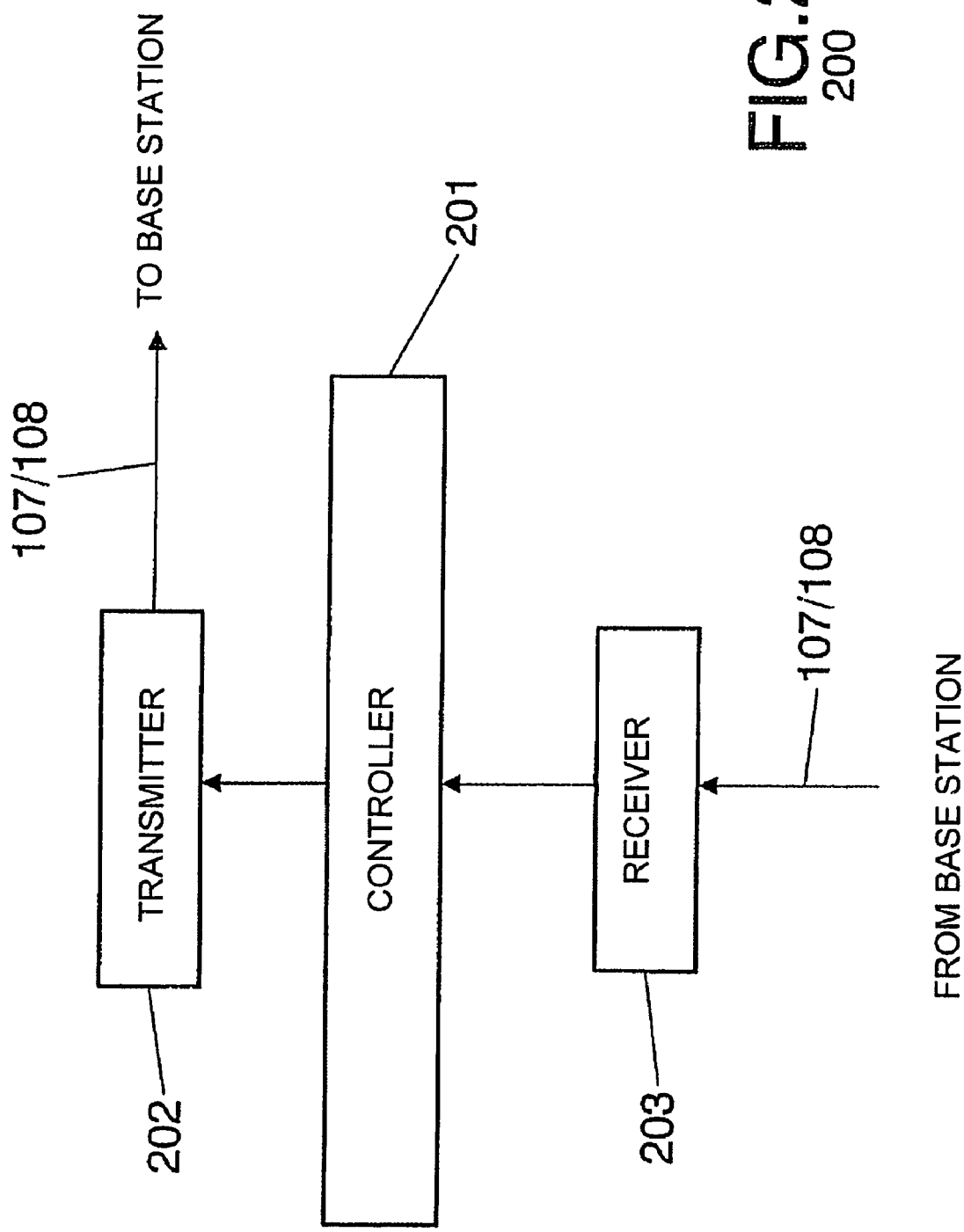
FIG. 2 is a block diagram of a portion of a base station or mobile station related to embodiments of the invention.

FIG. 2 shows the part of both stations (102 and 104) that includes the principles on which this invention is based. The elements shown in this figure that are not related to the invention are well known and will not be discussed. Both the base station and mobile station comprise a controller 201, an emitter 202 and a receiver 203. Thus, in the case of the base station 102 the received signal corresponds to the uplink 108 and in the case of the mobile station 104 the received signal is the downlink signal 107, both arriving at the controller 201 through the receiver 203. The power control system will deliver through the emitter 202 a command instructing the other station to increase or decrease its power depending on the result of the optimisation method described below, which sets the target desired signal to interference ratio that acts as the threshold in the closed loop of this power control system. One of the components of this power control system is the outer loop, for which this invention proposes a new method, as mentioned above. The stages that take place in the controller 201 and that correspond to this outer loop are shown in detail in FIG. 3.

According to the invention, both the base 102 and the mobile station 104 estimate the desired signal to interference ratio received $SIR_{rec}$ (see Sáez Ruiz, Juan Carlos: "Una Arquitectura Hardware para la Estimación de la Relación Señal a Interferencia en Sistemas WCDMA" (A Hardware Architecture for Estimation of the Signal to Interference Ratio in WCDMA Systems), Department of Electroscience, Digital ASIC University of Luna), as well as the corresponding statistical parameters for each type of communication (see Ali Abdi, Georgios B. Giannakis, Kaveh Mostaza: "Estimation of Doppler spread and signal strength in mobile communications with applications to handoff and adaptative transmission", WIRELESS COMMUNICATIONS AND MOBILE COMPUTING 2001; 1:221–242 (DOI: 10.1002/WCM.1)). For the NLOS case the following are estimated: the typical deviation corresponding to lognormal fading of the desired signal •$_N$, and that corresponding to the Gaussian distribution that describes the variations of the interfering signals, $\sigma_I$; for the LOS case, in addition to the above parameters the RICE K factor is also estimated. Then, for a given outage probability ($P_{Outage}$) the aforementioned Newton-Raphson iteration method is used to obtain the dB margin required to fulfil the aforementioned QoS. The previous margin is used to calculate the new desired signal to interference target ratio $SIR_{tgt}$, which shall be the reference threshold for the closed loop of the power control system.

A definition of all the parameters employed is provided below, although some have already been commented:

•$_N$=typical deviation of the lognormal fading of the desired signal (in dB);

$\sigma_I$=typical deviation of the Gaussian random variable that describes the variation of the interfering signals (in dB);

K=Rice factor (in dB);

$T_n$=outer loop period during which the channel statistical characteristics are estimated (in secs.);

$P_{Outage}$=desired outage probability, in this case it defines the Quality of Service (QoS) of the link;

$M_{(S/D)}|_0$=initial value of the SIR margin (in dB);

$M_{(S/D)}|_i$=value of the margin in the previous step of the Newton-Raphson iteration process (in dB);

$M_{(S/D)}|_{i+1}$=updated value of the margin in the Newton-Raphson iteration process (in dB);

g(x)=function whose zeroes are the solution of the Newton-Raphson method $SIR_{tgt}|_n$=estimated value of the target SIR in the current period (in dB);

$SIR_{max}$=maximum allowed SIR value for the link being considered (in dB);

$SIR_{min}$=minimum allowed SIR value for the link being considered (in dB);

The method stages are defined below taking as reference the blocks of FIG. 3:

The signal to interference ratio SIR is estimated in the block 301, where the corresponding hardware architecture is contained. The second order statistical moments are estimated during the outer loop period $T_n$ in the block 302, always taking as input the SIR provided by block 301; thus, for the NLOS case •$_N$ and $\sigma_I$ are estimated, and in the direct beam case (LOS) the corresponding Rice factor is also estimated.

The block 303 is the one most representative of the present invention, as in it the Newton-Raphson iteration method is applied which allows obtaining the margin (in dB) that fulfils the outage probability specification $P_{Outage}$ for the statistical characteristics estimated in 302. Thus, from an initial value $M_{(S/D)}|_0$ the function $g(M_{(S/D)}|_0)$ is calculated according to (9) and applying (10) new values are obtained for the margin until the difference between the last two values, $M_{(S/D)}|_0$ and $M_{(S/D)}|_{i+1}$, is less than $10^{-4}$.

After the margin adapted to the channel characteristics in period $T_n$ has been obtained, the target SIR corresponding to this margin, which we call $SIR_{tgt}|_n$ is calculated in block 304. The following conditions are established to prevent exceeding the allowed SIR limits:

If $SIR_{tgt}|_n > SIR_{tgt|max}$, the SIR is limited to this maximum value in block 305. Reciprocally, if $SIR_{tgt}|_n < SIR_{tgt|min}$, the SIR is limited to its minimum value in block 306.

Figure 3:
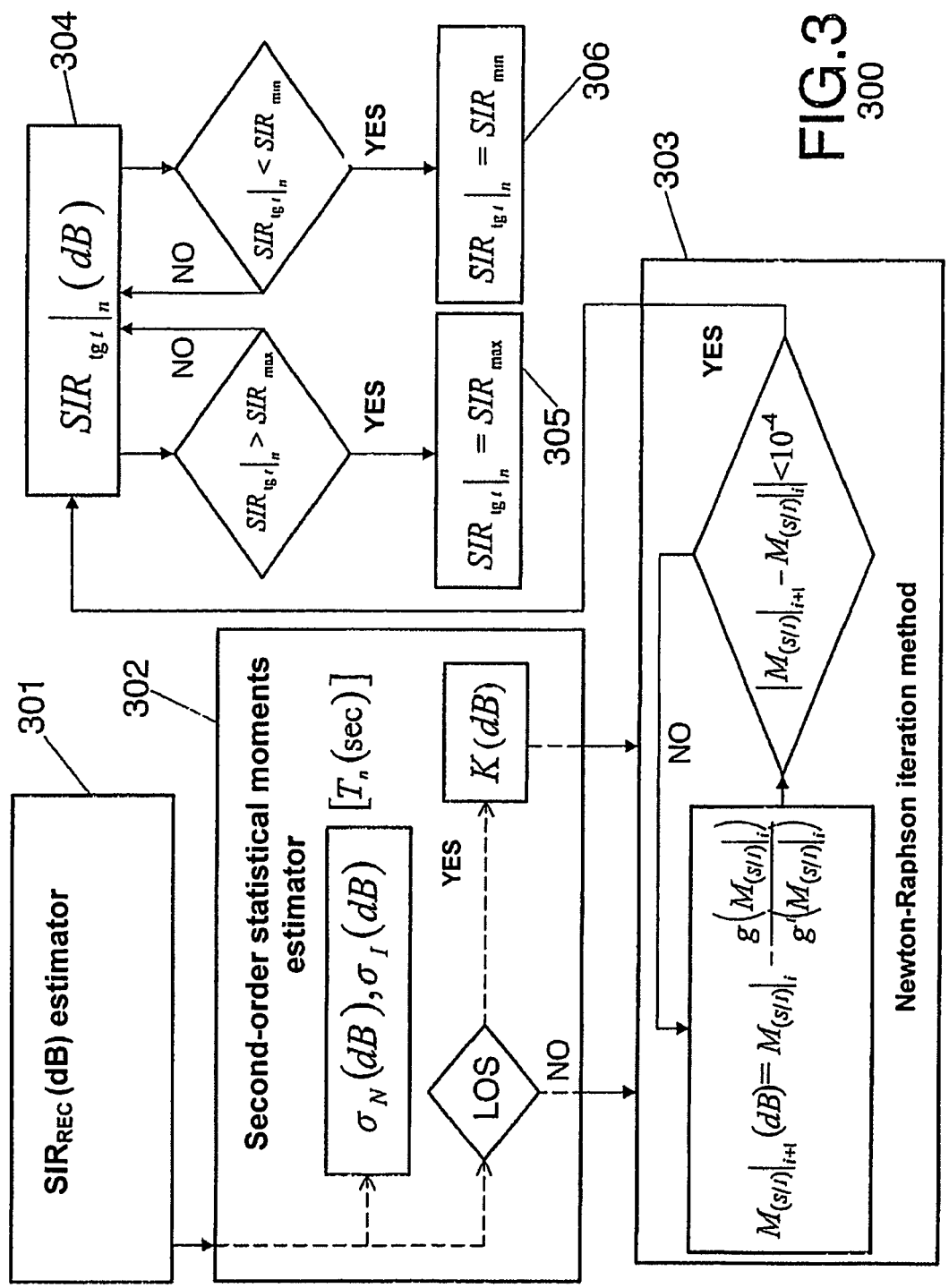
FIG. 3 is a flow diagram illustrating one embodiment of a method of the invention corresponding to the power control system outer loop of a WCDMA-based cellular network.
Figure 4:
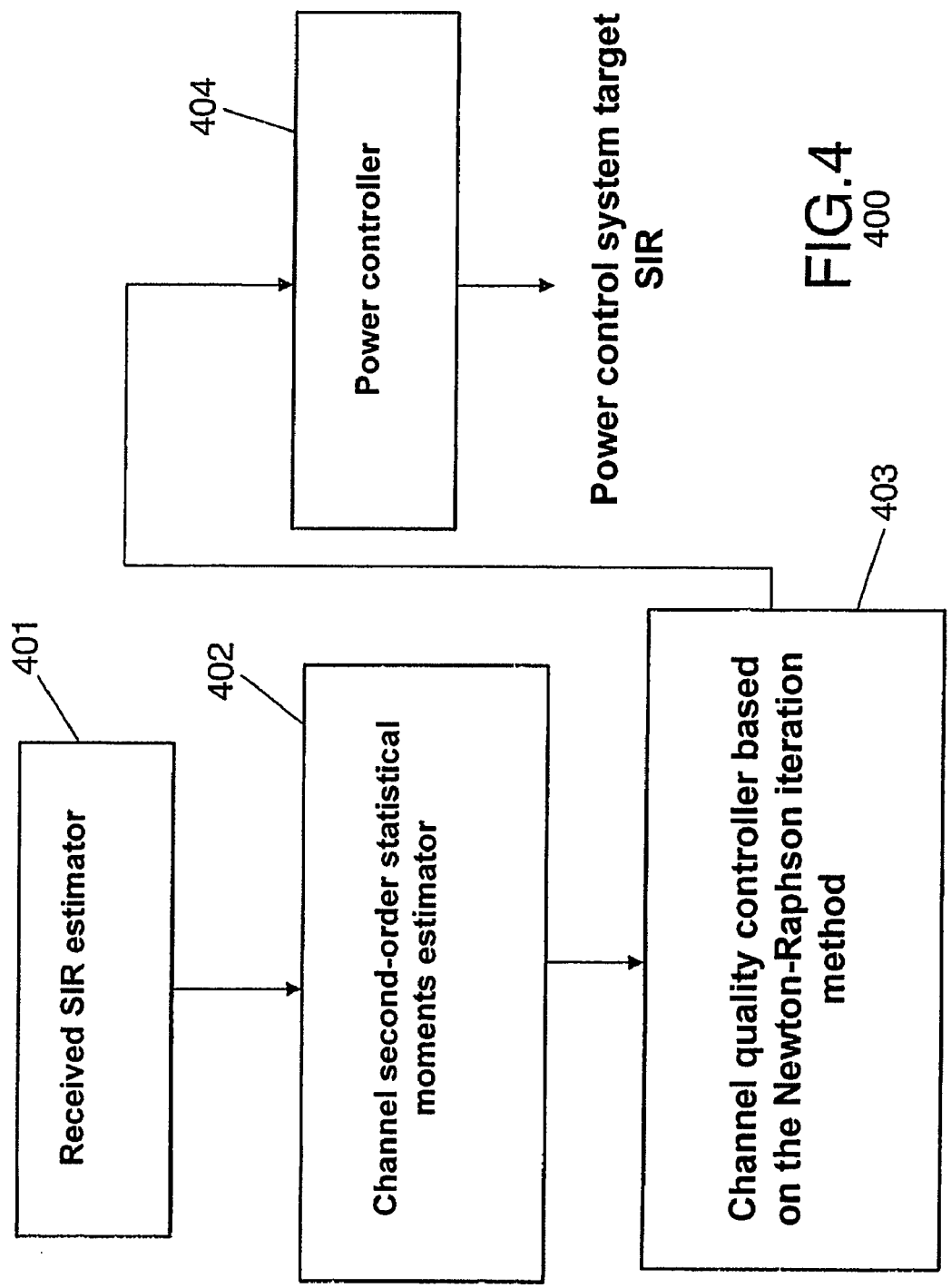
FIG. 4 is a flow diagram illustrating one embodiment of a method of the invention at a higher level, corresponding to the power control system outer loop of a WCDMA-based cellular network.

FIG. 4 shows a representation at a higher level of the method of the invention of FIG. 3. Thus, the block 401 is equivalent to the block 301 of the latter figure, block 402 represents the functionality described in 302, 403 (equivalent to 303) includes the Newton-Raphson iteration method and is known as the channel Quality Controller. Lastly, the maximum and minimum power limitations have been collected in block 404 of the aforementioned figure.

Verification of the New Method for the Outer Loop of a WCDMA Link Power Control System Firstly the result obtained for the direct problem in the two cases, LOS and NLOS is found, this is, the outage probability $P_{Outage}$ for a margin $M_{(S/D)}$ (dB) and for given statistical moments •$_N$ (db) and $\sigma_I$ (dB) for the NLOS case. For the LOS case, the input is the typical deviation resulting from lognormal fading and the Gaussian distribution of the interfering signals:

$$\sigma_{N-1}(dB) = \sqrt{\sigma_N^2 + \sigma_I^2},$$

as well as the Rice factor K(dB).

After the outage probability value is obtained, it is used as the input for the inverse problem, for which the previous values of the statistical moments are maintained. In this way a value should be obtained for the margin $M_{(S/I)}$ (dB) similar to that taken as input in the direct problem case:

Direct Problem for NLOS:
  Input:
    $M_{(S/I)}$=20 dB
    $\bullet_N$=4 dB
    $\sigma_I$=4 dB
  Output:
    $P_{Outage}$=0.0223

Inverse Problem for NLOS:
  Input:
    $P_{Outage}$=0.0223
    $\bullet_N$=4 dB
    $\sigma_I$=4 dB
  Output obtained:
    $M_{(S/I)}$=20.0004 dB Direct Problem for LOS:
  Input:
    $M_{(S/I)}$=20 dB
    $\bullet_{N-I}$=4 dB
    K=0 dB
  Output:
    $P_{Outage}$=0.0113

Inverse Problem for LOS:
  Input:
    $P_{Outage}$=0.0113
    $\bullet_{N-I}$=4 dB
    K=0 dB
  Output:
    $M_{(S/I)}$=19.9891 dB As we can see in both cases (LOS and NLOS) the approximation provided by the Newton-Raphson method is very accurate. The error committed is on the order of $10^{-3}$ dB.

The previous design has been used to describe the principles of the invention. However, other alternatives that are not discussed herein having the same spirit and purpose are possible. For example, although the invention has been illustrated here by discrete functional blocks (such as the controller 201), the functions of any of these blocks may be performed by one or several suitably programmed processors.

Given the generality of the statistical models considered, the invention can be applied to terrestrial, marine or aeronautical satellite-based systems (geostationary or otherwise) (see G. E. Corazza, F. Vatalaro, "A Rice-Lognormal Terrestrial and Satellite Channel Model", IEEE Trans. Veh. Technol., vol. 43, no. 3, p. 738–742, 1994). These models also reproduce the indoor propagation conditions (see Tadeusz A. Wysocki, Hans Jürgen Zepernick, "Characterization of the indoor radio propagation channel at 2.4 GHz", 3–4 2000, Journal of Telecommunications and information Technology), so that the invention may be used for the design and power control of systems used in this environment.

In the same sense, the invention can be applied to standards other than WCDMA, as well as to control the power of any signal received by the base or mobile stations.

In the field of simulation, the invention can be used as a link level simulator by the operators in the cellular planning stage (see Moreno González J. A., Miranda Sierra J. L., Eliseo Barandilla Torregrosa I., Lorca Hernando J., "Simulador de enlaces para el sistema UNTS en modo FDD" (Links Simulator for the UMTS system in FDD mode), Telefónica Móviles España, Telefónica I+D).

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. A method of determining a signal to interference target ratio for operation of the outer loop of a power control system of a mobile communications system with a cellular infrastructure, wherein the ratio is determined based on a signal received from one of a base station and a mobile station of the mobile communications system, the method comprising:
    estimating the desired signal to interference ratio of the received signal;
    estimating the following statistical moments of the desired signal to interference ratio: typical deviation of the slow or lognormal fading component, typical deviation of the Gaussian distribution describing the joint statistical variation of all interfering signals, and, in the case of a direct beam existing between the emitter and the receiver, the Rice factor, comprising the quotient of the deterministic component and the random component of the desired signal;
    based on the estimated statistical moments and on a specification of the outage probability, calculating the margin of the desired signal to interference ratio by the Newton-Raphson iteration method; and
    determining the desired signal to interference target ratio for the outer loop based on the calculated margin.

2. The method according to claim 1, further comprising using the numerical approximation for the probability distribution function corresponding to the desired signal to interference ratio of a communication without a direct beam between the emitter and the receiver, wherein the Newton-Raphson method is applied to obtain the margin of the ratio that will fulfil an outage probability specification, for statistical conditions determined by the typical deviation of the slow or lognormal fading component and the typical deviation of the Gaussian distribution that describes the joint statistical variation of all the interfering signals.

3. The method according to claim 2, further comprising numerically integrating the probability density function corresponding to the desired signal to interference ratio of a communication without a direct beam between the emitter and the receiver, thereby obtaining an expression for the outage probability with the statistical conditions typical deviation of the slow or lognormal fading component and the typical deviation of the Gaussian distribution that describes the joint statistical variation of all the interfering signals, wherein the expression is suitable for a subsequent application of the Newton-Raphson method.

4. The method according to claim 2, further comprising numerically integrating the probability density function corresponding to the desired signal to interference ratio of a communication with a non-zero deterministic component corresponding to the existence of a direct beam between the emitter and the receiver, thereby obtaining an expression for the outage probability with the statistical conditions including typical deviation of the slow or lognormal fading component, typical deviation of the Gaussian distribution that describes the joint statistical variation of all the interfering signals, and the Rice factor, so that the expression is suitable for a subsequent application of the Newton-Raphson method.

5. The method according to claim 1, further comprising using the numerical approximation for the probability distribution function corresponding to the desired signal to interference ratio of a communication with a non-zero deterministic component corresponding to the existence of a direct beam between the emitter and the receiver, wherein the Newton-Raphson method is applied to obtain the margin of the ratio that will fulfil an outage probability specification for statistical conditions determined by the typical deviation of the slow or lognormal fading component and the typical deviation of the Gaussian distribution that describes the joint statistical variation of all the interfering signals and the Rice factor.

6. An apparatus for implementing the outer loop of the power control system of a mobile communications system with a cellular infrastructure, comprising:
  a receiver configured to receives a signal from one of a base station and a mobile station of the mobile communications system;
  a processor configured to implement an operational method for the outer loop of the power control system,
  wherein the processor is configured to estimates the following statistical moments of the desired signal to interference ratio: typical deviation of the slow or lognormal fading component, typical deviation of the Gaussian distribution that describes the joint statistical variation of all the interfering signals, and the Rice factor, comprising the quotient of the deterministic component and the random component of the desired signal;
  wherein the processor is further configured to calculate, based on these statistical moments and an outage probability specification, a margin of the desired signal to interference ratio by the Newton-Raphson iteration method; and
  wherein the processor is further configured to determine, based at least in part on the calculated margin, the desired signal to interference target ratio for the aforementioned outer loop.

7. The apparatus according to claim 6, further comprising an emitter configured to send the power control information to the base station if the apparatus is in the mobile station, or to the mobile station if the apparatus is in the base station.

8. The apparatus according to claim 6, wherein the processor calculates the desired signal to interference ratio by the Newton-Raphson iteration method, and wherein the desired signal to interference ratio fulfils a given outage probability specification for statistical conditions characterised by the estimated statistical moments.

9. A computer readable medium having a program for executing a method of determining a signal to interference target ratio for operation of the outer loop of a power control system of a mobile communications system with a cellular infrastructure, wherein the ratio is determined based on a signal received from one of a base station and a mobile station of the mobile communications system, the method comprising:
  estimating the desired signal to interference ratio of the received signal;
  estimating the following statistical moments of the desired signal to interference ratio: typical deviation of the slow or lognormal fading component, typical deviation of the Gaussian distribution describing the joint statistical variation of all interfering signals, and, in the case of a direct beam existing between the emitter and the receiver, the Rice factor, comprising the quotient of the deterministic component and the random component of the desired signal;
  based on the estimated statistical moments and on a specification of the outage probability, calculating the margin of the desired signal to interference ratio by the Newton-Raphson iteration method; and
  determining the desired signal to interference target ratio for the outer loop based on the calculated margin.

* * * * *

UNITED STATES PATENT AND TRADEMARK OFFICE
CERTIFICATE OF CORRECTION

PATENT NO. : 7,200,123 B2
APPLICATION NO. : 10/538159
DATED : April 3, 2007
INVENTOR(S) : Alvaro Lopez Medrano It is certified that error appears in the above-identified patent and that said Letters Patent is hereby corrected as shown below:

At column 3, lines 16-17 (approx.), please delete "the characteristics...... by the link."

and insert the same on line 15 (approx.) as continuation of paragraph.

At column 4, line 53, after "1999)" please insert -- . --.

At column 5, lines 34-35 (approx.), please delete " $\int_\infty^\infty f_S(M_{S/I} - u)$ " and insert -- $\int_\infty^\infty f_S(M_{S/I} - u)$ --, therefor.

At column 5, lines 39-40 (approx.), please delete " $f_I \, du \, dM_{(S/I)}$ " and insert -- $f_I(u) \, du \, dM_{(S/I)}$ --, therefor.

At column 5, lines 46-48 (approx.), please delete " $\int_{-\infty}^{S_0} f_S$ " and insert -- $\int_{-\infty}^{S_U} f_S$ --, therefor.

At column 6, lines 63-65 (approx.), please delete " $\dfrac{10}{\ln(10)\sqrt{2\pi}\,\sigma_N}$ " and insert -- $\dfrac{10}{\ln 10 \sqrt{2\pi}\,\sigma_N}$ --, therefor.

UNITED STATES PATENT AND TRADEMARK OFFICE
CERTIFICATE OF CORRECTION

PATENT NO. : 7,200,123 B2  Page 2 of 3
APPLICATION NO. : 10/538159
DATED : April 3, 2007
INVENTOR(S) : Alvaro Lopez Medrano It is certified that error appears in the above-identified patent and that said Letters Patent is hereby corrected as shown below:

At column 7, lines 12-14 (approx.), please delete " $\frac{10}{\ln(10)\sqrt{2\pi}\,\sigma_N}$ " and insert -- $\frac{10}{\ln 10 \sqrt{2\pi}\,\sigma_N}$ --, therefor.

At column 8, line 55, please delete "distributio" and insert -- distribution. --, therefor.

At column 9, lines 15-17 (approx.), please delete " $(M_{(S/I)_0})f_I$ " and insert -- $(M_{(S/I)_0} - u)f_I$ --, therefor.

At column 10, line 25 (approx.), please delete " $F'_{SIR}|_{NLOS}$ " and insert -- $F'_{SIR}\big|_{NLOS}$ --, therefor.

At column 10, lines 26-27 (approx.), please delete " $F_{SIR}|_{LOS}$ " and insert -- $F'_{SIR}\big|_{NLOS}$ --, therefor.

At column 12, line 14, after "method" please insert -- . --.

At column 12, line 61, please delete " $\bullet_N(db)$ " and insert -- $\bullet_N(dB)$ --, therefor.

At column 12, lines 65-66 (approx.), please delete " $\sigma_{N-1}(dB) = \sqrt{\sigma_N^2 + \sigma_I^2}$, " and insert -- $\sigma_{N-I}(dB) = \sqrt{\sigma_N^2 + \sigma_I^2}$, --, therefor.

At column 14, line 45, in Claim 2, please delete "specification," and insert -- specification --, therefor.

At column 14, line 55, in Claim 3, after "conditions" please insert -- of --.

UNITED STATES PATENT AND TRADEMARK OFFICE
CERTIFICATE OF CORRECTION

PATENT NO. : 7,200,123 B2
APPLICATION NO. : 10/538159
DATED : April 3, 2007
INVENTOR(S) : Alvaro Lopez Medrano It is certified that error appears in the above-identified patent and that said Letters Patent is hereby corrected as shown below:

At column 15, line 23, in Claim 6, please delete "receives" and insert -- receive --, therefor.

At column 15, line 28, in Claim 6, please delete "estimates" and insert -- estimate --, therefor.

At column 15, line 41, in Claim 6, please delete "method;" and insert -- method --, therefor.

Signed and Sealed this

Seventeenth Day of June, 2008

JON W. DUDAS
*Director of the United States Patent and Trademark Office*